(12) United States Patent
Renner (10) Patent No.: US 7,474,925 B2
(45) Date of Patent: Jan. 6, 2009

(54) SYSTEM FOR AUTOMATION OF TECHNICAL PROCESSES

(76) Inventor: Peter Renner, Heiligenstock 2, D-51515 Kürten (DE)

( * ) Notice: Subject to any disclaimer, the term of this patent is extended or adjusted under 35 U.S.C. 154(b) by 956 days.

(21) Appl. No.: 10/411,355

(22) Filed: Apr. 10, 2003

(65) Prior Publication Data

US 2003/0200004 A1    Oct. 23, 2003

(30) Foreign Application Priority Data

Apr. 15, 2002    (EP)    ................. 02008464

(51) Int. Cl.
*G05B 11/01*    (2006.01)
*G05B 15/00*    (2006.01)
*G05B 19/42*    (2006.01)

(52) U.S. Cl. ............... 700/17; 700/18; 700/83; 700/86

(58) Field of Classification Search ......... 717/107–108; 700/17–18, 83, 86
See application file for complete search history.

(56) References Cited

U.S. PATENT DOCUMENTS

| | | | |
|---|---|---|---|
| 5,878,040 A | 3/1999 | Peirce | 370/389 |
| 5,893,105 A * | 4/1999 | MacLennan | 707/102 |
| 5,913,028 A | 6/1999 | Wang | 709/203 |
| 5,918,020 A | 6/1999 | Blackard | 709/228 |
| 6,157,649 A | 12/2000 | Peirce | 370/401 |
| 6,226,555 B1 * | 5/2001 | Kallal et al. | 700/21 |
| 6,298,377 B1 | 10/2001 | Hartikainen | 709/223 |
| 6,317,701 B1 | 11/2001 | Pyotsia et al. | 702/188 |
| 6,321,272 B1 | 11/2001 | Swales | 709/250 |
| 6,343,083 B1 | 1/2002 | Mendelson | 370/466 |
| 6,370,448 B1 | 4/2002 | Eryurek | 700/282 |
| 6,370,683 B1 * | 4/2002 | Sobers | 717/143 |
| 6,397,114 B1 | 5/2002 | Eryurek | 700/51 |
| 6,532,392 B1 | 3/2003 | Eryurek | 700/54 |
| 6,735,764 B2 * | 5/2004 | Nakai | 717/156 |
| 6,754,540 B1 * | 6/2004 | McFarland et al. | 700/18 |
| 6,865,729 B1 * | 3/2005 | McMillan et al. | 717/109 |
| 6,965,800 B2 * | 11/2005 | Schmit et al. | 700/29 |
| 7,146,231 B2 * | 12/2006 | Schleiss et al. | 700/83 |
| 7,317,959 B2 * | 1/2008 | Pfander et al. | 700/97 |
| 2002/0054099 A1 * | 5/2002 | Schmitt et al. | 345/762 |
| 2003/0130752 A1 * | 7/2003 | Gasiorek et al. | 700/86 |
| 2003/0167096 A1 * | 9/2003 | Nakai | 700/86 |
| 2006/0206866 A1 * | 9/2006 | Eldrige et al. | 717/122 |

FOREIGN PATENT DOCUMENTS

EP    0413044    8/1989

OTHER PUBLICATIONS

Mastering Simulink 4 (2nd Edition); Published Apr. 5, 2001 . . . see relevant pages included herein.*
Automatisierungstechnik; p. 20, 21, 22 Heft Jul. 1997. etz [Translation Attached].
The Design of Distributed Measurement on IEEE 1451 Standards and Distributed Time Services.

* cited by examiner

*Primary Examiner*—Ronald D Hartman, Jr.
(74) *Attorney, Agent, or Firm*—Charles L. Schwab; Nexsen Pruet, LLC (57) ABSTRACT

A system for automation of technical processes and/or experiments having a measurement unit and a control unit which are connected to sensors and actuators of the process or of the experimental unit via measurements and control channels, having at least one library that contains visualization objects and control modules, and having software that manages the system. The system enables the user to develop applications without knowledge of programming techniques. Technologists, chemists, scientists using the system no longer need to rely on the aid of programming specialist.

20 Claims, 4 Drawing Sheets

SYSTEM FOR AUTOMATION OF TECHNICAL PROCESSES

TECHNICAL FIELD

This invention relates to a system for automation of technical processes or experimental procedures having a measurement and control unit connected to sensors and actuators of a process, a library containing visualization objects and control modules together with software managing the system.

BACKGROUND OF THE INVENTION

There is a group of products known as "process instrumentation and control systems" on the market. They are often used to control and operate large industrial installations. Such systems work on two tracks. For control tasks they use automation software known as PLC (programmable logic controller) software and PLC programming system. Visualization software independent of the control software is used for operator guidance. Control software and visualization software run in distinct devices: the control software in PLCs or process control devices in a process plane, and the visualization software in the instrumentation and control plane. Therefore, the automation as a whole is not a self-contained unit. It is not possible to set up such automation without the aid of specialists. The expense is considerable.

At the end of the 1980s, when personal computers (PCs) with a degree of power and graphical capabilities had been developed, virtual measuring instruments appeared. Measuring instruments with knobs, buttons, switches and display instruments were known up to then. Measuring circuits were physically built up from wire and filters and the like.

The early measuring instruments were replaced by virtual measuring instruments and measuring circuits. Now one had illustrations of such devices on the screen. Turning knobs and actuating buttons and switches were replaced by mouse clicks. Automation was not yet associated therewith. A programming language was overlaid thereon to remedy this defect. In the view of many users, the setup of automation on the basis of such software solutions is very complicated and demands a long familiarization time. A user needs special knowledge that he must acquire. The expense is considerable. These solutions did not succeed in bringing about consistency between operating and observing and automation. In laboratory automation in particular, it would be very advantageous to have simple solutions making it possible to develop automation tasks quickly, without large expense and without the necessity of possessing special knowledge or employing specialists.

SUMMARY OF THE INVENTION

It is a primary object of the invention to remedy the before mentioned shortcomings by providing a closed unit or a system that enables the user to cause processes to run their course or to perform experiments without learning the syntax of a programming language. With this invention, a user can concentrate solely on his experimental and/or process tasks.

The object of the invention is achieved by using a measurement and control unit that is connected to sensors and actuators of the process or of the experimental unit via measurement and control lines, using at least one library that contains visualization objects and control modules, and by using software that manages the system. This invention permits proceedings that are laborious to carry out manually to be performed automatically by the herein disclosed system.

The measurement and control unit brings about the connection to the experimental setup or to the process that is to be automated. This connection to the process rests on measurement channels and control channels that are connected to the sensors and actuators of the process. In many cases it is also necessary for the measurement and control unit to have ports available through which other devices are integrated into the automation occurrence. Such devices can, for example, be scales whose measurements are supplied to the automation system via a port.

The software makes it possible to query the status of the experiment via the measurement portion of the measurement and control unit 49, draw the needful conclusions therefrom and, via the control portion, put the sequence of the experiment in the form desired by the user.

Figure 4:
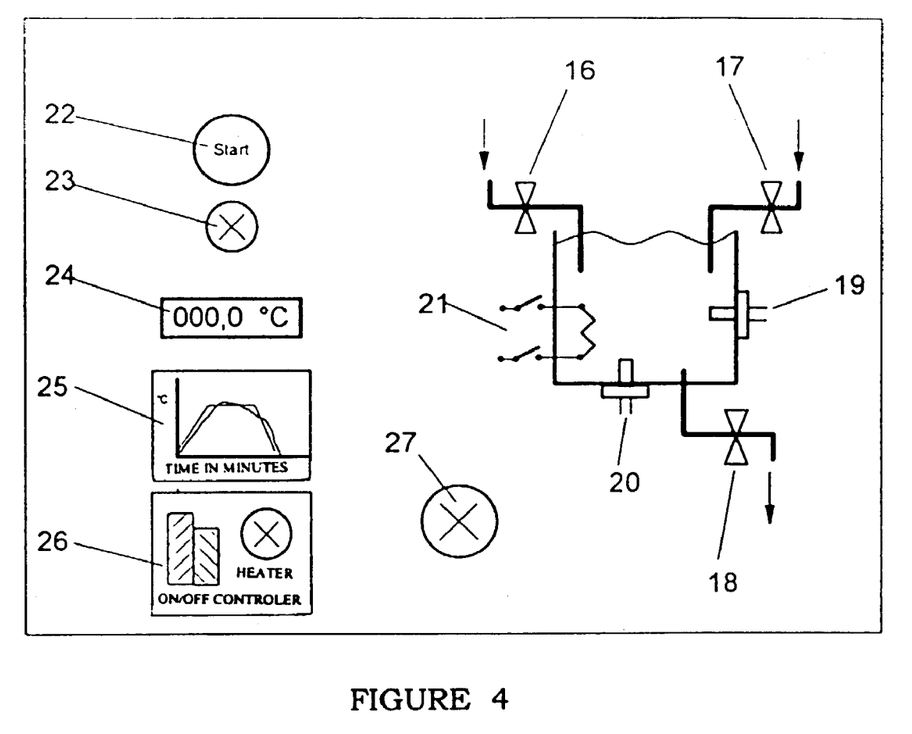
FIG. 4 shows the visualization diagram of an exemplary application.

The software further puts methods in the user's hands for observing and operating the experiment during runtime. This occurs via graphical screens, which may show process diagrams as shown in FIG. 4, that contain virtual buttons, display devices, trend plots, etc. Often a drawing or photograph depicting a picture of the process is found in the background. Such software can be referred to as visualization software.

Figure 6:
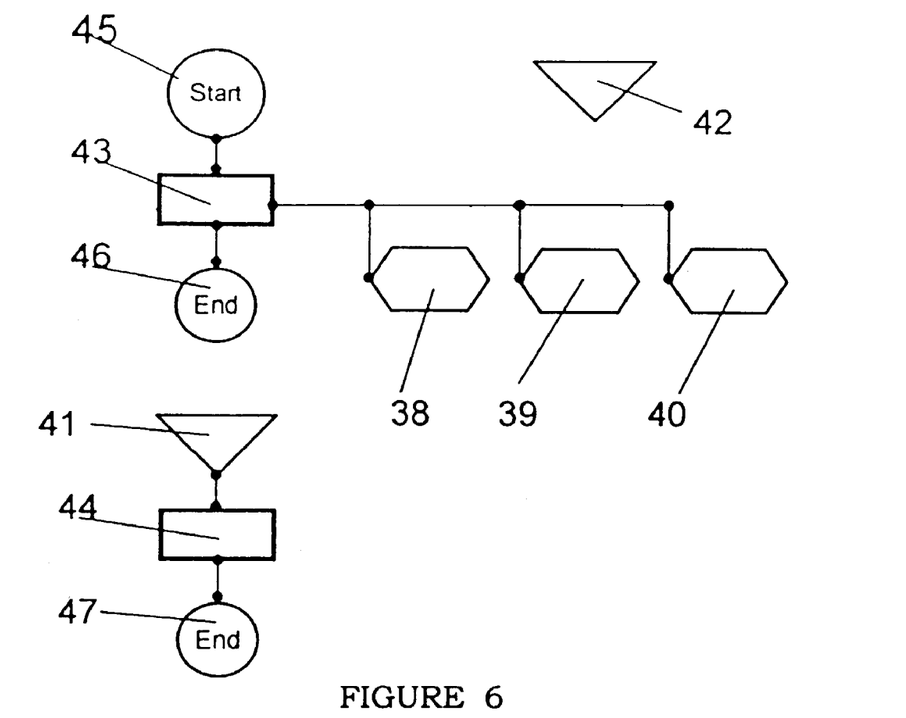
FIG. 6 shows the geometric figures of the control modules of the exemplary application in linked arrangement.

A library for visualization objects and a library for control modules is furthermore available according to the invention. The function of the visualization objects and control modules as illustrated in FIG. 6 becomes clear through the examples. The visualization objects are the port to the operator. They are graphical objects that cover controls such as buttons, switches, input boxes. These can be arranged on the screen surface, changed in their size, and furnished with special properties without the necessity of programming for this purpose. The control modules are designed to control and thereby to automate the sequence of an application.

Provision is made for a user to first select, from a library, those visualization objects, that he needs for his automation task. He will arrange them on the screen in diagrams, such as shown in FIG. 4, give them a desired size, select colors, texts and the like. In this way he has visually set up his operator interface. Thus selection options are placed in the user's hands step by step until the automation task is finally developed.

Visualization objects are linked to control modules predefined as to their function. Both together contribute to the accomplishment of sub-tasks of automation. When a visualization object has been selected, the linked control module is simultaneously shown in a module window without effort on the user's part.

In a further embodiment of the invention it is provided that there are, in the program code of the control modules, instructions that directly change the properties of visualization objects. Writing of text messages in text output boxes and similar control transactions are directly integrated into the automation process by querying properties of, for example, a virtual button.

A user, from the knowledge of his experiment, can select further modules from the library of control modules. The previously automatically exhibited control modules do not cover all functions necessary for the accomplishment of the automation task. The framework of the automation task is completed with the choice of the further control modules A central idea of the invention for the achievement of the overall object is to allocate the control modules to the categories sequences, events and functions, wherefrom three types of control modules are derived. These are the sequence module, event module and function module types.

The sequence module type, as its name states, is responsible for the temporal ordering of various activities one after another. It handles process guidance. These activities are affected by the status of the automating process and by operator transactions. For example, further actions must wait to be run until a temperature has been reached. The process can wait at a certain point until an operator transaction has taken place.

The event module type processes proceedings are chiefly unexpected for the process sequence and can arise at an arbitrary point in time. The event modules are invoked by interrupts. As soon as the event arises, activities are initiated that break into the sequence. After the activities of the event have been worked through, the normal sequence is resumed unless the event has as its consequence a safety shutdown that terminates the program. Event modules are, however, never invoked by other modules. Events can include sequences that break into but never supplant the original sequence. Event modules are almost always linked to visualization objects.

The function module type includes special functions, for example controller, measurement, set points controlled in dependence on time, and the like. Function modules are characterized by the fact that they work concurrently with sequence modules. Thus function modules work in parallel to sequences. Process guidance is not handled by function modules. Function modules can be broken into by events. Function modules can be invoked and terminated by sequences and events. Function modules can always be linked to visualization objects. In this way an observer can, for example, observe the correct function of a controller. He can analyze courses of curves in a trend graphic.

It can be seen that this classification greatly facilitates the development of the automation task, especially as the event modules and the function modules are automatically placed in the module window upon the choice of visualization objects. If the program start and program end are left aside as obvious, the user only has to be concerned with the choice of the sequence modules.

Figure 2:
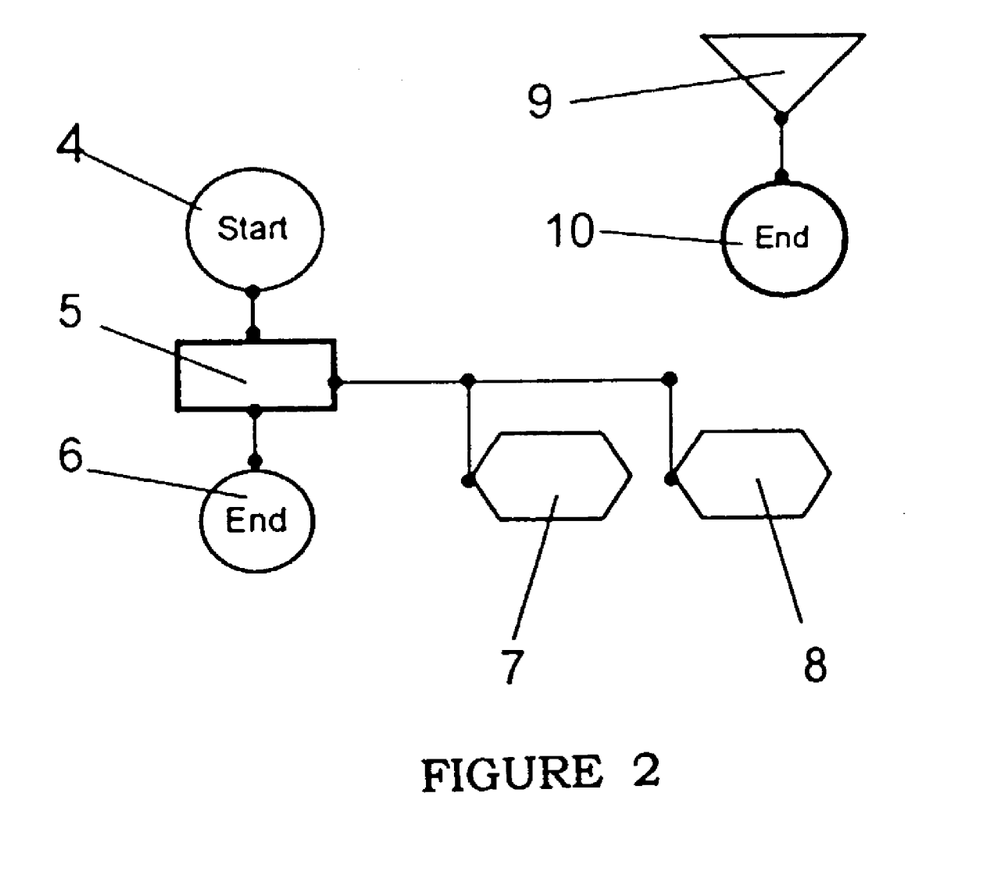
FIG. 2 shows an example for the chaining of control modules.

In further embodiment of the invention it is provided to assign a symbolic figure to each of the sequence, event and function modules. These symbolic figures should be clearly distinct from one another. In conjunction with chaining, which is described further on, they make it easy for the user to recognize the structure of his automation task. If the user pulls a module from the library into the module window, the module will manifest itself as a symbolic figure on the screen surface of the module window. Other modules, as already described, are automatically exhibited when the corresponding visualization object is exhibited. The user can arrange the figures on the screen as he would like to shape the sequence as illustrated in FIGS. 2 and 6.

A further feature of the invention provides that the modules are graphically connected or chained to one another by lines. Such chaining is depicted and described in FIGS. 2 and 6. A user will connect the individual modules to one another in a way that corresponds to the course of the program. This chaining must occur under fixed rules according to the invention. For instance, sequence modules and event modules must always be chained vertically. Function modules, on the other hand, are chained horizontally. Vertically chained modules are responsible for process guidance. Horizontally chained modules always work in parallel to vertically chained modules. A user will desirably arrange the modules from top to bottom in a way that corresponds to the course of the program. A further rule is that event modules can never be invoked by other modules. As mentioned previously, they are invoked by cyclical interrupts. With these simple rules and the apparatus and programs illustrated in FIGS. 1-3, the construction and operation of the automation system can be recognized at a glance. The geometric figures, as illustrated in FIGS. 2 and 6, makes it easy for the system operating personnel to visualize the operation of the controlled process.

A great part of the development work has already been performed without special knowledge being demanded for the purpose. The user can concentrate fully on his process that he would like to automate. What now has to be done in the further development work is to give to the modules the properties needed for the specific automation task.

In a further embodiment of the invention, the module configuration screen opens to the user by marking the symbolic figure of a control module in the module window and, for example, by double-clicking on the marked figure. There he will find, depending on the module type, a program skeleton or input dialogs (similar to forms). In the case of modules that perform standard tasks, such as controllers, he will find input dialogs that enable him to parameterize the module. In the case of other modules such as sequences and events, he will find a program skeleton.

Although this code is a script language, the user need not learn the language. Further features of the invention serve this purpose. In the program skeletons he finds keywords specially emphasized, for example by underscoring. His task is then to replace these keywords by further keywords, program code, variables and constants. This occurs in that he clicks on the keyword. A knowledge list then opens. From this knowledge list he chooses a list item, which replaces the keyword. How this is achieved in practice is described in an example. Configuration of the module is finished when all underscored keywords have been replaced by program code, variables and constants.

The following example of an event module that controls a digital display instrument with the individual name "TempDisplay" will make this clear. The digital display device is assigned the task of continuously displaying the value of the analog channel with the name "TempSensor." All that the user must do is to select the variable "TempSensor" from the knowledge list "AnalogChannels." The following code appears in the configuration window:

```
Message: Please choose the analog channel that you wish
   to have displayed.
EventModule[DigitalDisplay TempDisplay]
   Action: Set Visu [DigitalDisplay TempDisplay.
      Display=Analog Input Name]
EndMod
```

The knowledge list "AnalogChannels" opens with a click on the keyword AnalogInputName. The user selects the channel that he would like to display, namely "TempSensor." The channel name instantly replaces the underscored keyword and the display becomes:

```
Message: Please choose the analog channel that you wish
   to have displayed.
EventModule DigitalDisplay TempDisplay]
   Action: Set Visu [DigitalDisplay TempDisplay.
      Display=TempSensor]
EndMod
```

Now the value of TempSensor is updated on every cyclical interrupt.

According to the invention, the program code knows only two categories of instructions. These are queries and actions. The program code is thus very easy to read, as shown by the following example:

```
Query: If AnalogInput [AnalogInput TempSensor>100]
   then
   Action: Set DigitalOutput [DigitalOutput Heater=Off]
Query: If now but not previously then
   Action: Run[OnOffController TempController]
Query: If not then
   Action: Repeat
```

The function is as follows: If the temperature measured with TempSensor is higher than 100° C., the heater is turned off. If the temperature has just reached or exceeded 100° C., OnOffController TempController is invoked. It should be noted that this occurs only once and, specifically, at the point in time when the temperature exceeds the limit. If the temperature is lower than the limit, the sequence of commands is repeated.

The query category contains the instruction "If TYPE [logical operation] then" with the options "If now but not previously then" and "If not then." This instruction, indeed, contains the command "IF then else," known per se. The instruction according to the invention is inventive because, with the optional instruction "If now but not previously then," it contains the possibility of detecting exactly the point in time at which the event arose. Thus the "If [ ] then" construct expands to new dimensions by further facilitating the user's development of his application.

The known programming languages are text-based. This means that a user will type in the commands that he is newly formulating except for those that he copies from another text region. These steps are time-consuming and error-prone. There is thus a danger of syntax errors. The invention takes a quite novel route in that the script is graphically oriented. The individual components of the script, such as keywords, instructions, variables, constants—in short, script objects—are graphical objects. These graphical objects are in part the subject of the program skeletons of the individual modules. Also, as previously described, further script objects can be taken from the knowledge or library lists and inserted into the script via keywords. The script objects are arranged in line-oriented fashion, so that the graphical script does not look much different from a text-based script. The advantages are obvious because handling is easier. It is further possible to append image-oriented symbols to the text-oriented script objects, so that the language can be still further simplified.

The constant 100 appears in the instruction "Query: If AnalogInput [AnalogInput TempSensor>100] then." The user must be given the opportunity to create a graphical object that includes the value of a constant. This can be implemented in a simple way with "pop-up menus."

BRIEF DESCRIPTION OF THE DRAWINGS

For the further explanation of the invention, reference is made to the simplified depictions of exemplary embodiments in the drawings, in which.

DETAILED DESCRIPTION OF THE INVENTION

Figure 1:
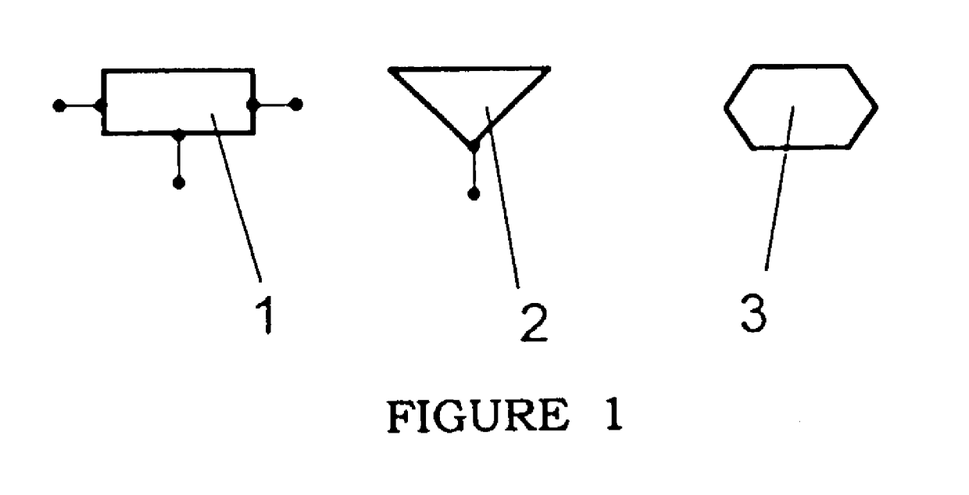
FIG. 1 shows an example for the choice of geometric figures to represent the three categories sequence modules, event modules, function modules.

Referring to FIG. 1 the reference characters have the following meanings:

1 is a geometric figure representing a sequence module;
2 is a geometric figure representing an event module; and
3 is a geometric figure representing a function module.

Figure 3:
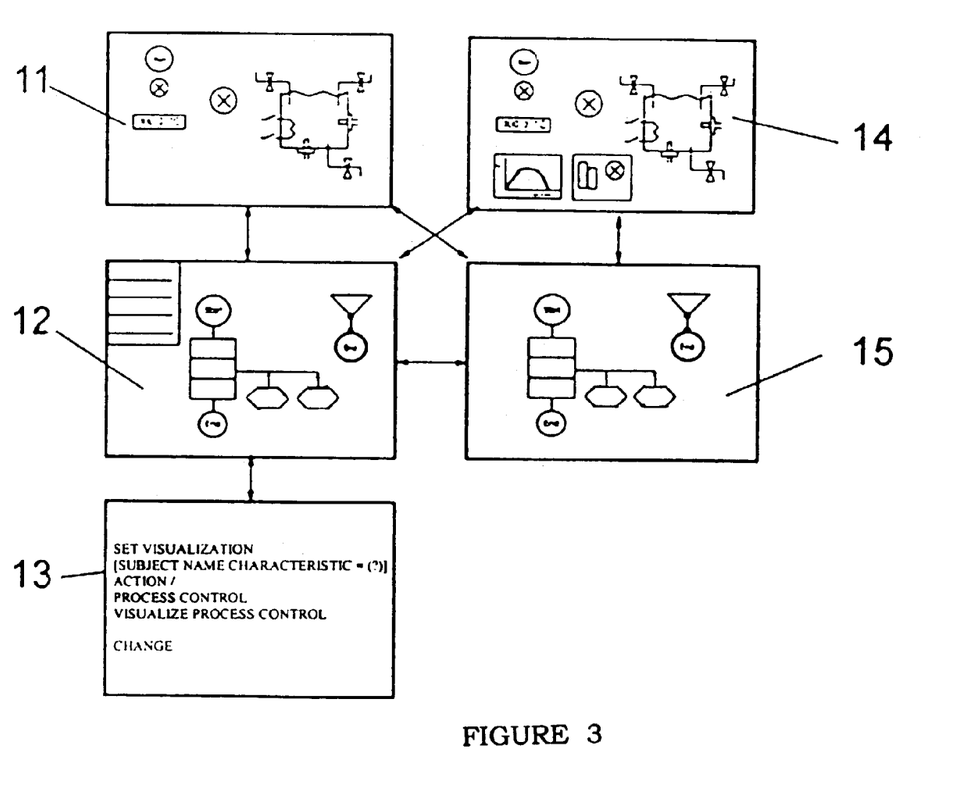
FIG. 3 shows the screens for development mode and runtime mode.

The geometric figures of FIG. 1 represent the control modules and are depicted as graphical objects in the module window 12 of FIG. 3. They can be linked to one another according to specified rules in a way that corresponds to the program sequence. When the graphical object is marked and double-clicked, the configuration window 13, as shown in FIG. 3, opens. The module can now be configured.

In FIG. 2 the reference characters have the following meanings:

4 is a graphical object of the start module;
5 is a graphical object of a sequence module;
6 is a graphical object of an end module;
7 is a graphical object of a function module;
8 is a graphical object of a further function module;
9 is a graphical object of an event module; and
10 is a graphical object of a further end module.

If the program is started in runtime mode as illustrated by a visualization screen 14 in FIG. 3, the sequence module 5 takes over process guidance. The function modules 7 and 8 are invoked during the runtime of the sequence module 5. The module 7 could be a function module of controller type. The module 8 could be a function module of measurement type with the task of acquiring, visualizing and storing measurement data. The event module 9 and the end module 10 represent a safety shutdown feature. If the experiment gets out of control, such as when certain limits are exceeded and event 9 arises, the program end module 10, invoked by the event, makes sure that all functions are shut down.

In FIG. 3 the reference characters have the following meanings:

11 is a screen in development mode;
12 is a module window in development mode;
13 is a configuration window;
14 is a visualization screen in runtime mode; and
15 is a module window in runtime mode.

The screens 11, 12 and 13 are used for development of an application. This mode is designated as development mode. The three screens are therefore available to the user during the development phase. The screens 14 and 15 enable the user to operate the process during runtime. This is achieved with virtual objects such as buttons, switches, text input boxes and the like. Visualization objects such as trend graphics, virtual signal lamps and display devices further make it possible to observe the process. This mode is designated as runtime mode. In runtime mode the application can be started and stopped. The user can switch back and forth between development mode and runtime mode.

The screen 11 makes it possible to install and configure visualization objects on the screen in development mode. This is the first step toward development of an application. The library of visualization objects is available for installation. When an object is selected, it is depicted as a graphical object on the screen 11 and the screen 14. An object is selected when an individual name has been given to it. Now the individual objects can be configured through adaptation of their object properties. Object properties are size, coloration, text, and status such as on/off.

The module window 12 enables the user to install, arrange and link control modules during development. The user can pass from the individual module objects into the configuration window 13 and configure the individual modules. This is the second step toward development of an application. By double-clicking on the geometric figure of a control module, configuration window 13 opens and the previously prepared program skeletons, depending on the module chosen, appear. Standard functions such as controllers are configured via input masks. In the case of modules that are represented by a module skeleton in the configuration window 13, the module skeleton is supplemented, subject to specified rules, into functionally finished modules.

When the individual modules are configured, the third step toward development of the application follows. The individual modules are appropriately arranged in the module window 12 and graphically connected to one another according to specified rules, as is necessitated by the automation task.

Figure 5:
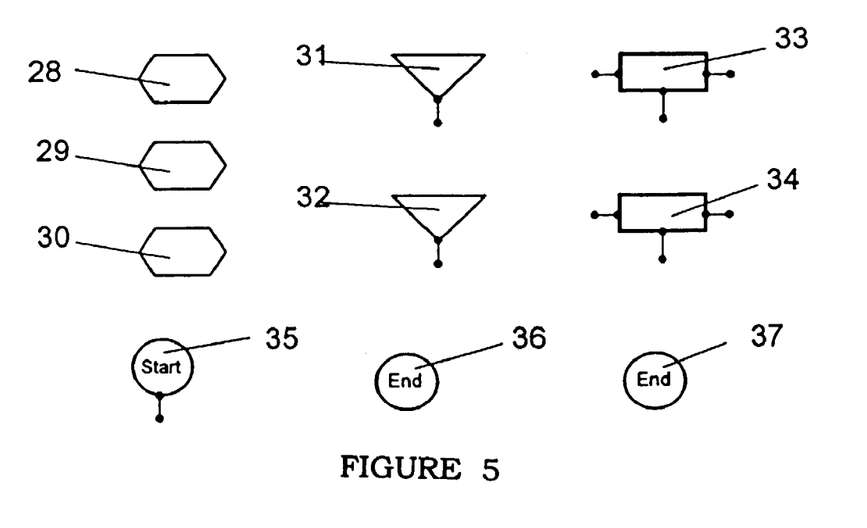
FIG. 5 shows the geometric figures of the control modules of the exemplary application in not-yet-linked arrangement.

The following description, with FIGS. 4, 5 and 6, depicts an automation solution according to the invention. The designations in quotation marks are individual names.

In FIG. 4 the reference characters have the following meanings:

- 16 is an assigned digital output of the measurement and control unit with the name "ValveA," which controls the supply of the first liquid medium;
- 17 is an assigned digital output of the measurement and control unit with the name "ValveB," which controls the supply of the second liquid medium;
- 18 is an assigned digital output of the measurement and control unit with the name "Drain," for the emptying of the reactor vessel;
- 19 is an assigned analog input of the measurement and control unit with the name "TempSensor," for acquisition of the liquid temperature;
- 20 is an assigned analog input of the measurement and control unit with the name "TempSafety," for acquisition of the liquid temperature;
- 21 is an assigned digital output of the measurement and control unit with the name "Heater," which heats up the water temperature;
- 22 is a visualization object of Button type with the name "StartButton";
- 23 a visualization object of SignalLamp type with the name "OperationOn";
- 24 is a visualization object of DigitalDisplay type with the name "DigitalDisplay," for displaying the liquid temperature;
- 25 is a visualization object of Profile type with the name "SetpointSpec," depiction of the liquid temperature versus time with setpoint temperature and actual temperature;
- 26 is a visualization object of OnOffController type with the name "TempController," depiction of the setpoint temperature and actual temperature of the liquid as bars and of a virtual lamp, heater on/off; and
- 27 is a visualization object of SignalLamp type with the name "Malfunction." The shutdown modules are assigned to the "Malfunction" signal lamp.

The function corresponding to FIG. 4 is as follows. FIG. 4 shows a process diagram such as a user can build up. The subject of the process to be automated is a reactor vessel such as is frequently used in the chemical industry. The figure, which includes details 16 to 21, is a schematic depiction of the reactor. A user can prepare such an image with a drawing program and insert it into a process diagram such as illustrated in FIG. 4. He can, however, also use a photograph of his process. Items 22 to 27 are standardized visualization objects. He takes these from the library for visualization objects by drawing them as graphical objects from a list on the screen and giving them an individual name. He can position these visualization objects, change their size and furnish them with properties. Such properties can be coloration, words or other descriptors. The properties of a visualization object or description depend on the nature of the object. Control modules are assigned to the visualization objects. These control modules automatically receive the same individual name as the corresponding visualization object. The program automatically exhibits a list of the corresponding control modules. This list is available to the user in module window 12 of FIG. 3.

The sequence of the automation task in runtime mode begins when button 22, "StartButton," is pressed. The program waits until this button is pressed. This occurs by double-clicking on visualization object 22, "StartButton." The program continues when this has occurred. Now "ValveA" 16 is opened for 15 seconds and "ValveB" 17 for 20 seconds by the digital outputs of the measurement and control unit. Lamp 23 "OperationOn" is turned on, and a waiting time of 25 seconds commences. In this way the tank of the reactor is charged with the desired liquid media.

The visualization object 25 "SetpointSpec" of Profile type this supplies the time-controlled setpoint for the on/off controller with the name "TempController" 26 of OnOffController type. The function module "SetpointSpec" 25 of Profile type is configured as follows: During one hour the temperature is warmed up from 20° C. to 100° C. During a further hour the temperature is held at 100° C. During a further hour the temperature cools down to 20° C. Function module "SetpointSpec" 25 supplies the setpoint for "TempController" 26. The task of "TempController" 26 is to control the liquid temperature according to the setpoint "SetpointSpec" 25 so that the temperature correctly tracks the temporal sequence provided. The visualization object of "SetpointSpec" 25 shows, with its two curves, the temporal sequence of the setpoint and of the actual value. In this way, an observer has the opportunity to monitor the correct sequence of the experiment.

Function module "TempController" 26 of OnOffController type controls the liquid temperature according to the setpoint specified by function module "SetpointSpec" 25 of Profile type, with the aid of temperature sensor "TempSensor" 19 and of the digital output of the measurement and control unit with the name "Heater" 21. Concurrently with function module "SetpointSpec" 25 and of "TempController" 26, the function module of Measurement type with the name "Trend" is invoked. This is not depicted as a visualization object in the diagram of FIG. 4. Its visualization object is located in a further diagram, not depicted. The measured curve, however, is windowed in visualization object "SetpointSpec" 25. The task of the function module "Trend" is to acquire and store the measured values continuously during the three hours so that the measured data are available for a later interpretation.

When the time of three hours of function module "SetpointSpec" 10 has elapsed, the temperature of the liquid is cooled to ambient temperature under setpoint control. The digital output of the measurement and control unit "Drain" assigned to valve 18 now opens valve "Drain" 18, so that the tank of the reactor vessel is emptied. The program is then terminated.

The visualization object "DigitalDisplay" 24 of DigitalDisplay type works separately from the previous proceeding. It is the event module, whose task is to display cyclically the liquid temperature in "DigitalDisplay" 24. A shutdown event is assigned to the visualization object "Malfunction" 27 of SignalLamp type and the function is next described. The temperature sensing element "TempSafety" 20 is provided on grounds of safety. A test is automatically performed cyclically to determine whether the measured values of temperature sensing elements "TempSensor" 19 and "TempSafety" 20 differ from each other by not more than 2° C. If the temperature difference becomes larger, a shutdown is initiated. If the temperature difference becomes larger, it can be inferred that the temperature measurement of one of the two paths is in a malfunctioning condition. A further shutdown is initiated if the liquid temperature exceeds a value of 120° C., for example because the control action of "TempController" 26 has gotten out of control. When the shutdown event arises, malfunction lamp 27 is turned on, "Heater" 21 is turned off, and valve "Drain" 18 is opened for approximately 50 seconds so that the tank is emptied. The program is terminated afterward.

If a user has exhibited the diagram according to FIG. 4, the corresponding function modules and event modules are stored in a list that is accessible via module window 12 of FIG. 3. These are not, however, all of the modules that are needed for the automation task described. The sequence module(s) is (are) still lacking. Process guidance is allocated to the sequence modules. A user can take these modules from a list in module window 12 of FIG. 3 and place them on the screen as geometric figures. The individual geometric figures that the user has exhibited in module window screen 12 of FIG. 3, initially unordered, can be seen in FIG. 5.

In FIG. 5 the reference characters have the following meanings:

28 is the function module of Profile type with the name "SetpointSpec," which supplies the setpoint for the liquid temperature;

29 is the function module of OnOffController type with the name "TempController";

30 is the measurement function module with the individual name "Trend";

31 is the event module with the individual name "ShutdownEvent," which initiates the shutdown;

32 is the event module of DigitalDisplay type with the name "DigitalDisplay," which controls the digital display;

33 is the sequence module with the individual name "Control," which takes care of process guidance;

34 is the sequence module with the individual name "Shutdown," which controls the shutdown;

35 is the start module with the individual name "Start";

36 is the end module with the individual name "End," which terminates the automation task normally; and

37 is the end module with the individual name "EndShutdown," which terminates the automation task in case of malfunction.

The function corresponding to FIG. 5 is next describe. It is now assumed that the user has now installed all the control modules on his module window screen 12 of FIG. 3. The modules are scattered about, and the further task is to arrange these modules, to configure them under fixed rules and to link them by connecting the modules with connecting lines in a functionally appropriate way. The individual modules show distinct figures according to their allocation to the categories, that is, sequence modules, event modules and function modules, as well as the start module and the end module.

In FIG. 6 the user has ordered the geometric figures of the modules, unordered in FIG. 5, connected by lines, as is necessitated by the automation task according to the example of FIG. 4. The reference characters in FIG. 6 have the following meanings:

38 is the function module of Profile type with the name "SetpointSpec," which supplies the setpoint for the liquid temperature;

39 is the function module of OnOffController type with the name "TempController";

40 is the measurement function module with the individual name "Trend";

41 is the event module with the individual name "ShutdownEvent," which initiates the shutdown;

42 is the event module of DigitalDisplay type with the name "DigitalDisplay," which controls the digital display;

43 is the sequence module with the individual name "Control," which takes care of process guidance;

44 is the sequence module with the individual name "Shutdown," which controls the shutdown;

45 is the start module with the individual name "Start";

46 is the end module with the individual name "End," which terminates the automation task normally; and

47 is the end module with the individual name "EndShutdown," which terminates the automation task in case of malfunction.

On the basis of sequence module "Control" 2 of FIG. 6 it will be shown how a user can build up his program sequence according to the invention without having programming knowledge available. This is made possible by keywords, which bring about access to knowledge lists. The task of the user is to select from the respective knowledge list the item that he needs for the fulfillment of his task. A sequence module is made up of individual steps, which are worked through in order.

The tasks that sequence module "Control" 2 of FIG. 5 must perform are listed as follows:

Step 1

Wait for actuation of "StartButton" 7 of FIG. 4.

Step 2

Open valve "ValveA" of FIG. 4 for 15 seconds. (Charge first liquid.)

Open valve "ValveB" 2 of FIG. 4 for 20 seconds. (Charge second liquid.)

Turn on lamp "OperationOn" 8 of FIG. 4.

Commence waiting time of 25 seconds. (Tank is then charged.)

Start profile function module "SetpointSpec" 10 of FIG. 5.

Start OnOffController function module "TempController" 11 of FIG. 5.

Start measurement function module "Trend" 31 of FIG. 5.

Commence waiting time of 3 hours. The experiment is then terminated.

In order to carry out a configuration, a configuration window 3 is provided as shown in FIG. 3. By double-clicking on sequence module "Control" 2 in FIG. 5, one reaches configuration window 13 of FIG. 3. There the program skeleton of the selected module "Control" is depicted. The program skeleton is a copy of the library module of SequenceModule type. This copy comes into being when the name, in this case "Control," is given to the sequence module. The configuration window 13 shows:

SequenceModule [Control] Message: Step 1

StepProcedure

EndModule

The sequence module contains the keyword StepProcedure. By double-clicking, the knowledge list StepProcedure opens. This includes all available step procedures. Window 13 shows:

KnowledgeList StepProcedure
    StandardStep
    Wait for switch actuation
    Wait for button press
    Wait for TextInput Because a press of the Button "StartButton" is to be waited for in step 1, the list item (Wait for button press) is chosen. The keyword StepProcedure is now replaced. Window 13 displays:

```
SequenceModule [Control] Message: Step 1
    Step Button        Message: Step 1
        Query: If [Button. Name. pressed = Yes/No] then
            Action:
        Query: If not then
            Action: Repeat
    Endstep
    StepProcedure
EndModule
```

The keyword StepProcedure is automatically inserted after Endstep in order to facilitate the installation of a further step procedure.

The keyword was replaced by Step "Button." A user will clear the lines that he does not need. An action instruction is not needed, because all that is waited for is the button press; afterward the program continues at the next step. The user will therefore clear the line in which Action appears. Window 13 then shows:

```
SequenceModule [Control] Message: ............
    Step Button        Message: Step 1
        Query: If [Button. Name. pressed = Yes/No] then
        Query: If not then
            Action: Repeat
    Endstep
    StepProcedure
EndModule
```

Next the two keywords Name and Yes/No in the above display must be replaced. The knowledge list for the keyword Name contains the individual names of the visualization objects that have been selected for the task in question (FIG. 4). Window 13 may show:

KnowledgeList Name
        StartButton; ValveA; ValveB; OperationOn; SetpointSpec; TempController; Trend; Drain; . . . .

StartButton is chosen. The knowledge list Yes/No contains a plurality of terms that represent logical 1 and logical 0. Such as:

```
            KnowledgeList Yes/No
            logical 1      Yes; On; High; True
            logical 0      No; Off; Low; False
Yes is chosen.
```

The sequence module "Control" now appears in Windows 13 as follows.

```
SequenceModule [Control] Message: ............
    Step Button        Message: Step 1
        Query: If [Button. StartButton. pressed = Yes] then
        Query: If not then
            Action: Repeat
    Endstep
    StepProcedure
EndModule
```

The first step is thus finally configured. Now the second, and thus last, step must be configured.

All actions to be executed in step 2 are listed in order. No (If [ ] then) queries are necessary. The following listed activities of step 2 are all actions.

Action: Open "ValveA" 1 of FIG. 4 for 15 seconds. (Charge first liquid.)
    Action: Open "ValveB" 2 of FIG. 4 for 20 seconds. (Charge second liquid.)
    Action: Turn on visualization object of Lamp type "OperationOn" 8 of FIG. 4.
    Action: Commence waiting time of 25 seconds. (Tank is then charged.)
    Action: Start function module of Profile type "SetpointSpec" 10 of FIG. 5.
    Action: Start function module of OnOffController type "TempController" 11 of FIG. 5.
    Action: Start function module of Measurement type "Trend" 13 of FIG. 6.
    Action: Commence waiting time of 3 hours. (Experiment is then terminated.)

The keyword StepProcedure must now be replaced with:

KnowledgeList StepProcedure
    StandardStep
    Wait for switch actuation
    Wait for button press
    Wait for TextInput The list item StandardStep is chosen. StandardStep now replaces the keyword StepProcedure. Window 13 shows:

```
SequenceModule [Control] Message: ............
    Step Button        Message: Step 1
        Query: If [Button StartButton. pressed = Yes] then
        Query: If not then
            Action: Repeat
    Endstep
    Step StandardStep        Message: Step 2
        Query:
            Action:
        Query: If not previously then
            Action:
        Query: If not then
            Action:
    Endstep
    StepProcedure
EndModule
```

Because queries are not needed, the user will clear these lines. He knows that eight actions are necessary; he will thus provide eight Action lines by inserting lines as follows:

```
SequenceModule [Control] Message: ............
    Step Button        Message: Step 1
        Query: If [Button StartButton. pressed = Yes] then
```

-continued

```
        Query: If not then
             Action: Repeat
        Endstep
        Step StandardStep       Message: Step 2
             Action:
             Action:
             Action:
             Action:
             Action:
             Action:
             Action:
             Action:
        Endstep
        StepProcedure
        EndModule
```

The first action of step 2 is open "ValveA" 1 of FIG. 4 for 15 seconds. (Charge first liquid.) "ValveA" is actuated by a logical output of DigitalOutput type "ValveA" of the measurement and control unit. The knowledge list action window will invite action as follows:

```
KnowledgeList Action
SetAnalogOutput [AnalogOutputName = (?)]      Set an analog output
     to value (?)
SetDigitalOutput [DigitalOutputName = (H/L)]  Set a digital output
     to High or Low
Set Visu [TYPE ObjectName. Property = Parameter]   Change the
object property
Repeat                    Undetermined loop of a step or module
Repeat (?)                (?) loops of a step or module
Wait                      Undetermined waiting time
Wait (?) sec.             Wait for (?) seconds
Run [TYPE ModuleName]     One module invokes another module
```

The list item SetDigitalOutput [DigitalOutputName=H/L] is chosen. "ValveA" is chosen for DigitalOutputName. The configuration window will show:

```
        SequenceModule [Control] Message: ............
        Step Button         Message: Step 1
             Query: If [Button.StartButton. pressed = Yes] then
             Query: If not then
                  Action: Repeat
        Endstep
        Step Standard Step      Message: Step 2
Action: SetDigitalOutput [ValveA = H/L]
             Action:
             Action:
             Action:
             Action:
             Action:
             Action:
             Action:
        Endstep
        StepProcedure
        EndModule
```

For the keyword H/L, the following items are available from the knowledge list H/L:

```
        KnowledgeList H/L
        Logical 0;                  Logical 1
        0                           1
        Close                       Open
        De-energize                 Energize
```

```
        Off                         On
        Low                         High
        Wrong                       Right
        No                          Yes
        Close for (?) sec.          Open for (?) sec.
        De-energize for (?) sec.    Energize for (?) sec.
        Off for (?) sec.            On for (?) sec.
        Low for (?) sec.            High for (?) sec.
```

The list item Open for (?) sec. is chosen. For (?), 15 is substituted. The window shows:

```
        SequenceModule [Control] Message: ............
        Step Button         Message: Step 1
             Query: If [Button.StartButton. pressed = Yes] then
             Query: If not then
                  Action: Repeat
        Endstep
        Step Standard Step      Message: Step 2
             Action: SetDigitalOutput [ValveA = Open for 15 Sec.]
             Action:
             Action:
             Action:
             Action:
             Action:
             Action:
             Action:
        Endstep
        StepProcedure
        EndModule
```

The opening of ValveB for 20 sec. is done in the same way.

All further actions are configured in the same way. Function modules are invoked with Run [TYPE ModuleName]. The type of the module, Profile, OnOffController, Measurement is selected from the knowledge list TYPE. The individual names of the modules "SetpointSpec," "TempController," "Trend" are chosen from the knowledge list ModuleNames.

Because no further step is necessary, the keyword StepProcedure is cleared.

Hence the completely configured sequence module "Control" has the following appearance:

```
        SequenceModule [Control] Message: ............
        Step Button         Message: Step 1
             Query: If [Button.StartButton. pressed = Yes] then
             Query: If not then
                  Action: Repeat
        Endstep
        Step StandardStep       Message: Step 2
             Action: SetDigitalOutput [ValveA = Open for 15 sec.]
             Action: SetDigitalOutput [ValveB = Open for 20 sec.]
             Action: Set Visu [Lamp OperationOn. Color = green]
             Action: Wait 25 sec.
             Action: Run [OnOffController TempController]
             Action: Run [Measurement Trend]
             Action: Wait 10800 sec.
        Endstep
        EndModule
```

The example can be extended in a variety of ways and formulated variously without new inventive ideas being needful. For example, data such as opening times of the valves can be taken from input lists. One could provide an additional StopButton in a simple way. Thus the experiment could be manually terminated at any time.

Figure 7:
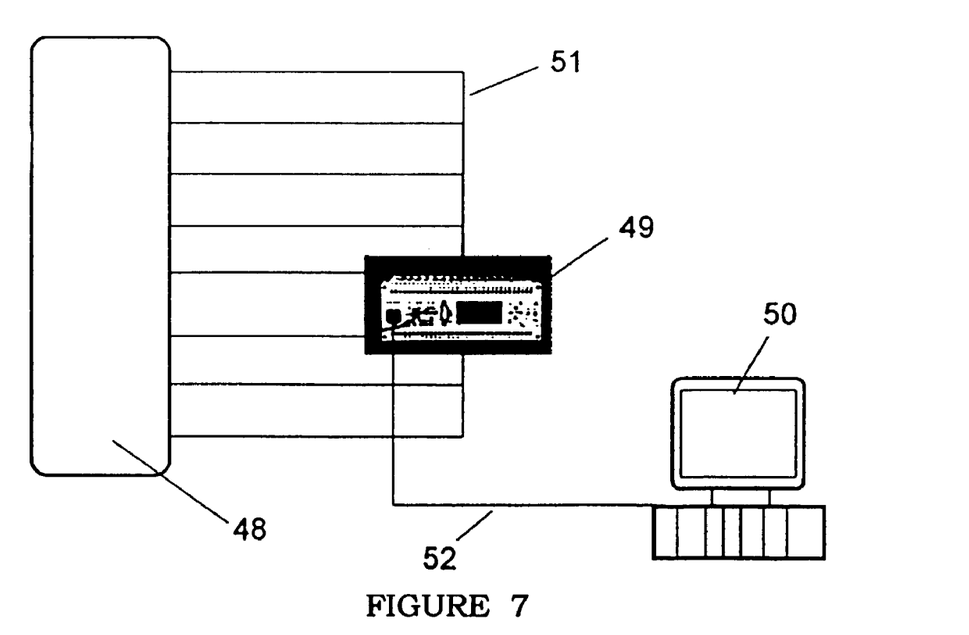
FIG. 7 depicts in simplified form the automation setup with the application to be automated.

In FIG. 7 the reference characters have the following meanings:
- 48 is an arbitrary application to be automated, depicted symbolically;
- 49 is the measurement and control unit, which brings about the joining element between application and data processing;
- 50 is a data processing device in which the automation program runs out;
- 51 is the cable connections to the sensors and actuators of the application; and
- 52 is the data connection between the measurement and control unit and the data processing device.

The system function corresponding to FIG. 7 is next described. The schematically depicted application 48 can be an arbitrary experimental apparatus in research or development. It could be a cooking process in the case of the production of food. It could be a test stand for the testing of engines.

The task of a measurement and control unit 49 is to acquire the signals of various sensors and transform them into physical quantities such as temperatures, pressures, flow rates, rotation speeds, velocities. Further, circuit input data can be acquired, for example whether a machine is turned on or off, whether valves are open or closed, and other information. The process underlying the application can be controlled in the desired fashion via logical outputs and analog outputs of measurement and the control unit 49. Further, measurement and output devices such as scales, large-scale displays can be integrated into the automation process through standardized data ports. In the case of simple applications, the measurement and control unit 49 can also be fashioned as plug-in boards in a data processing device 50.

The data processing device 50 serves as man/machine interface and hosts the control software. Cable connections 51, depicted schematically, bring about the connections between the sensors and actuators of the process. A data connection 52 is a standardized port, for example Ethernet, via which measurement and control unit 49 and the data processing device 50 can be integrated into larger data networks.

What is claimed is:

1. A system for automation of a technical process or experimental procedure having sensors and actuators,
   - a measurement and control unit connected to said sensors and actuators by measurement and control lines wherein said unit reports system conditions,
   - at least one library containing visualization objects and control modules, said control modules including sequence modules capable of temporal ordering of said technical process in response to said system conditions, event modules capable of being invoked by interrupts and function modules operating concurrently with said sequence modules and capable of being invoked and terminated by said sequence modules and said event modules and
   - software operatively associated with said measurement and control unit and said library, said software managing said system.

2. The system for automation of claim 1 and further comprising control modules predefined as to their function and having module windows, at least one control module of said control modules being linked with visualization objects facilitating the performance of predetermined sub-tasks, and wherein, upon the choice of one of said visualization objects, the linked control module is shown in one of said module windows.

3. The system for automation of claim 2 wherein the properties of said visualization objects can be changed by said control modules and wherein said control modules include operator transactions affecting the automated procedure.

4. The system for automation of claim 3 wherein said sequence modules monitor process guidance, wherein event modules break into other control modules at arbitrary points in time and take over process guidance during the interruption.

5. The system for automation of claim 1 wherein the properties of said visualization objects can be changed by said control modules and wherein said control modules include operator transactions.

6. The system for automation of claim 1 wherein said library includes at least one control module of said control modules not linked with visualization objects.

7. The system for automation of claim 1 wherein said sequence modules and said event modules are chained vertically and are responsible for process guidance and wherein said function modules are chained horizontally and work in parallel with said vertically chained modules without taking over process guidance.

8. The system for automation of claim 7 wherein one module selected from said sequence modules and said function modules is invokable during runtime by any other module according to the chaining.

9. The system for automation of claim 7 wherein when at least two modules selected from said sequence modules and said event modules are vertically chained while said function modules are horizontally chained with said sequence modules and said technical procedure or experimental procedure takes a vertical course from top to bottom.

10. The system for automation of claim 7 wherein a direction of chaining is interchanged without change of the function.

11. The system for automation of claim 1 wherein an event module of said event modules is invoked by a cyclical interrupt at an event and break into any one of said sequence modules thereby creating interrupt workings, function modules and other of said event modules, the interrupted workings of said modules being continued after the event has been worked through.

12. The system for automation of claim 1 wherein said control modules contain parts symbolic representations being provided for said control modules and containing assigned scripts.

13. The system for automation of claim 1 wherein distinct symbolic figures are allocated to said control modules as recognition features.

14. The system for automation of claim 13 wherein said symbolic figures can be displayed in a module window and can be chained vertically and horizontally according to fixed rules.

15. The system for automation of claim 1 wherein said control modules contain program instructions and keywords.

16. The system for automation of claim 15 wherein program instructions, variables and keywords which are selected automatically replace an original keyword.

17. The system for automation of claim 16 wherein replacement of keywords is continued until all keywords have been replaced by program instructions, variables or constants.

18. The system for automation of claim 16 wherein the program instructions of said control modules are queries and actions.

19. The system for automation of claim 18 wherein the queries contain an instruction with an appropriate formulation "If (logical operation) then" and with the options "If now but not previously then" and "If not then," by which the exact point in time at which an event arose is reported.

20. A system for automation of a technical process or an experimental procedure having sensors and actuators,
   measurement and control unit connected to said sensors and actuators by measurement and control lines,
   at least one library containing visualization objects and control modules, said control modules including sequence modules, event modules and function modules, and software operatively associated with said measurement and control unit and said library, said software managing said system, said control modules containing program instructions and keywords, variables and further keywords, wherein individual concepts of the script language, selected from keywords instructions, variables and constants, are visibly displayed as graphical objects, wherein script objects are arranged in line-oriented fashion and wherein access to knowledge lists, containing program instructions, variables and further keywords is opened by an operator interacting with emphasized keywords.

* * * * *